(12) United States Patent
Ng et al.

(10) Patent No.: US 10,845,857 B2
(45) Date of Patent: Nov. 24, 2020

(54) USB POWER ADAPTER FOR ENABLING USB PERIPHERAL DEVICE TO FUNCTION AS AN IOT DEVICE

(71) Applicants: Wing Hon Ng, Hong Kong (CN); Kin Ip Li, Hong Kong (CN)

(72) Inventors: Wing Hon Ng, Hong Kong (CN); Kin Ip Li, Hong Kong (CN)

(73) Assignee: U-THING TECHNOLOGY LIMITED, Hong Kong (CN)

( * ) Notice: Subject to any disclaimer, the term of this patent is extended or adjusted under 35 U.S.C. 154(b) by 115 days.

(21) Appl. No.: 16/139,055

(22) Filed: Sep. 23, 2018

(65) Prior Publication Data

US 2019/0094935 A1 Mar. 28, 2019

Related U.S. Application Data

(60) Provisional application No. 62/564,234, filed on Sep. 27, 2017.

(51) Int. Cl.
| | | |
|---|---|---|
| *G06F 1/26* | (2006.01) | |
| *G06F 13/42* | (2006.01) | |
| *H04B 3/02* | (2006.01) | |
| *H01R 31/06* | (2006.01) | |
| *H01R 24/62* | (2011.01) | |
| *H01R 107/00* | (2006.01) | |
| *H01R 13/66* | (2006.01) | |

(52) U.S. Cl.
CPC .......... *G06F 1/266* (2013.01); *G06F 13/4282* (2013.01); *H04B 3/02* (2013.01); *G06F 2213/0042* (2013.01); *H01R 13/6675* (2013.01); *H01R 24/62* (2013.01); *H01R 31/065* (2013.01); *H01R 2107/00* (2013.01)

(58) Field of Classification Search
CPC combination set(s) only.
See application file for complete search history.

(56) References Cited

U.S. PATENT DOCUMENTS

| | | | |
|---|---|---|---|
| 6,956,464 B2 | 10/2005 | Wang et al. | |
| 7,132,927 B2 | 11/2006 | Rapaich | |
| 7,420,459 B2 | 9/2008 | Pruchniak | |
| 8,812,883 B2* | 8/2014 | Farrar | G06F 1/266 |
| | | | 713/300 |
| 8,941,976 B1 | 1/2015 | Maroney | |
| 2004/0186926 A1* | 9/2004 | Rapaich | G06F 1/26 |
| | | | 710/8 |

(Continued)

*Primary Examiner* — Raymond N Phan
(74) *Attorney, Agent, or Firm* — Raymond Nuzzo

(57) ABSTRACT

A USB power adapter has a built-in powerline communication interface and includes an electrical power connection to a powerline, such as a home power socket. The USB power adapter also includes one or more USB receptacles to connect to USB peripheral devices. The USB power adapter includes power converter circuitry and power delivery control logic for sourcing the USB power to the USB peripheral device connected to the USB power adapter, wherein the sourced USB power is compliant with the USB protocol. The USB power adapter includes a microcontroller unit (MCU) that interfaces with both the USB host controller and the powerline communication controller and has a protocol to establish the communication between the USB peripheral device and the powerline communication gateway server in order to create an IoT operation.

10 Claims, 9 Drawing Sheets

(56) References Cited

U.S. PATENT DOCUMENTS

| | | | |
|---|---|---|---|
| 2010/0259097 A1* | 10/2010 | Kim | H01R 31/065 307/1 |
| 2014/0218974 A1* | 8/2014 | Chang | H02M 1/10 363/21.01 |
| 2019/0094935 A1* | 3/2019 | Ng | G06F 1/266 |

* cited by examiner

USB POWER ADAPTER FOR ENABLING USB PERIPHERAL DEVICE TO FUNCTION AS AN IOT DEVICE

CROSS REFERENCE TO OTHER PATENT APPLICATIONS

This application claims the benefit of U.S. Provisional Application No. 62/564,234, filed Sep. 27, 2017. The entire disclosure of U.S. Provisional Application No. 62/564,234 is hereby incorporated by reference into this present application.

STATEMENT OF GOVERNMENT INTEREST

Not Applicable.

FIELD OF THE INVENTION

The present invention relates to a power apparatus, more particularly, to a USB power adapter having a built-in Powerline Communication (PLC) interface that can convert a USB Peripheral Smart Object to an IoT device.

BACKGROUND

The Internet of Things (IoT) has been receiving much attention due to the popularity of handheld devices such as smart phones, tablets and similar devices that are used for displaying information as well as remotely controlling different electronic or electrical devices through the data network infrastructure. Powerline networking is a technology that is also receiving much attention. Powerline networking is a network that is used to transport data over AC or DC powerlines. Currently, technology development groups such as the HomePlug® Alliance are developing technology specifications and standards for powerline networking. The HomePlug 1.0 standard was released in June 2001 and has evolved into HomePlug AV, HomePlug AV2 and HomePlug Green PHY, thereby extending the capability on both different performance standard of speed and distance. Universal Serial Bus (USB) has long been an established industrial standard defining the connection between computers and peripheral devices. The USB standard is an evolving standard and its recent update of USB 3.1, which adds the Power Delivery capability, significantly enhances the data speed and power supply capacity that allows connecting USB devices to sink up to 100 watts of power. As a result, the USB standard can now accommodate a larger variety of electronic or electrical devices.

FIG. 1 is a block diagram showing a functioning electronic device (ED) 11 electrically connected to a power adapter 12 in accordance with conventional practices. The power adapter 12 is plugged into the AC powerline 14. The power adapter 12 has the power conversion circuitry that converts the AC power to a specific DC output having voltage (V+ and Ground) and current. The electronic device (ED) operates on the DC voltage and current provided by power adapter 12. Electronic device (ED) 11 is typically electrically connected to the power adapter 12 via a two wire cable 13 having a specific power jack 15 that plugged onto the power socket 16 of electronic device (ED) 11. Power jack 15 does not have a unified standard dimension, but is varied depending on the power rating.

Electronic devices have evolved over the last few years and now incorporate electronics that allow the electronic device to have data processing and communication capability thereby making the electronic device more advanced in handling its own specific function. Such an electronic device is referred to as a "Smart Object" (SO). In the age of the Internet, Smart Objects extend the communication capability to the internet world so as it can interact with other Smart Objects through the data network infrastructure. Hence, the Smart Object (SO) becomes an Internet of Things (IoT) smart device. This is illustrated by the block diagram of FIG. 2. Smart Object (SO) 21 is electrically connected to conventional power adapter 12 which was shown in FIG. 1. Smart Object 21 receives its DC power from power adapter 12. Smart Object 21 is formed by combining the electronics of electronic device 11 (see FIG. 1) with additional electronic hardware that can implement data processing and data communication functions. This allows Smart Object 21 to be connected to the data network infrastructure (i.e. Internet) through the communication function and become an Internet of Things (IoT) device. Data communication to the network infrastructure can occur by one of two ways. First, an Ethernet data path, indicated by reference number 22, can be used to establish data communication with the network infrastructure. The second way to establish data communication with the network infrastructure is wireless, typically through WiFi.

What is needed is a new and improved system of providing electrical power and connectivity to the network infrastructure that has a simplified electrical cable system.

SUMMARY OF INVENTION

The present invention sets forth a unique and novel portable USB power adapter having a built-in powerline communication interface that provides both network connection and electrical power supply for circuitry in the USB power adapter. Thus, the USB power adapter provides two essential functions to the USB peripheral electronic device connected to the adapter: (1) provide USB connection including both power and data, and (2) provide powerline network connectivity. The USB power adapter of the present invention easily converts any USB peripheral smart object to an IoT device. In an exemplary embodiment, the USB power adapter includes an electrical power input that can be connected to either an AC (Alternate Current) powerline or a DC (Direct Current) powerline 14. The AC or DC powerline provides both the electrical power and data connectivity through the powerline communication circuitry. The USB power adapter further includes a microcontroller unit which performs many functions. Such functions include USB peripheral device enumeration and initialization. Another function is to establish the corresponding communication with the USB peripheral device according to the enumeration result of the device information. The microcontroller unit also maintains the network communication via the built-in powerline communication interface circuit with the backend powerline communication gateway (PLC Gateway). Another important function of the microcontroller is to establish the data communication path between the USB peripheral device and the PLC Gateway. Hence, the USB peripheral device plugged onto the USB power adapter will become a connected IoT device.

The USB power adapter of the present invention simplifies the cable connection of the USB peripheral electronic device requiring only a single USB cable that provides both power and data communication. This is contrary to the conventional method that requires separate power and data cables. Furthermore, the USB standard communication protocol significantly simplifies the interface to different vendors' USB peripheral devices and helps to establish a well-behaved multi-vendor IoT environment.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

As used herein, the terms "USB peripheral device" and "Smart Object Device" are used interchangeably and shall refer to any USB electronic devices that utilize USB format data communication. The "USB peripheral device" may also be referred to herein as a "Consumer USB Device" as it sinks power and does not source power.

As used herein, the abbreviation "PLC" shall mean "powerline communication".

Figure 1:
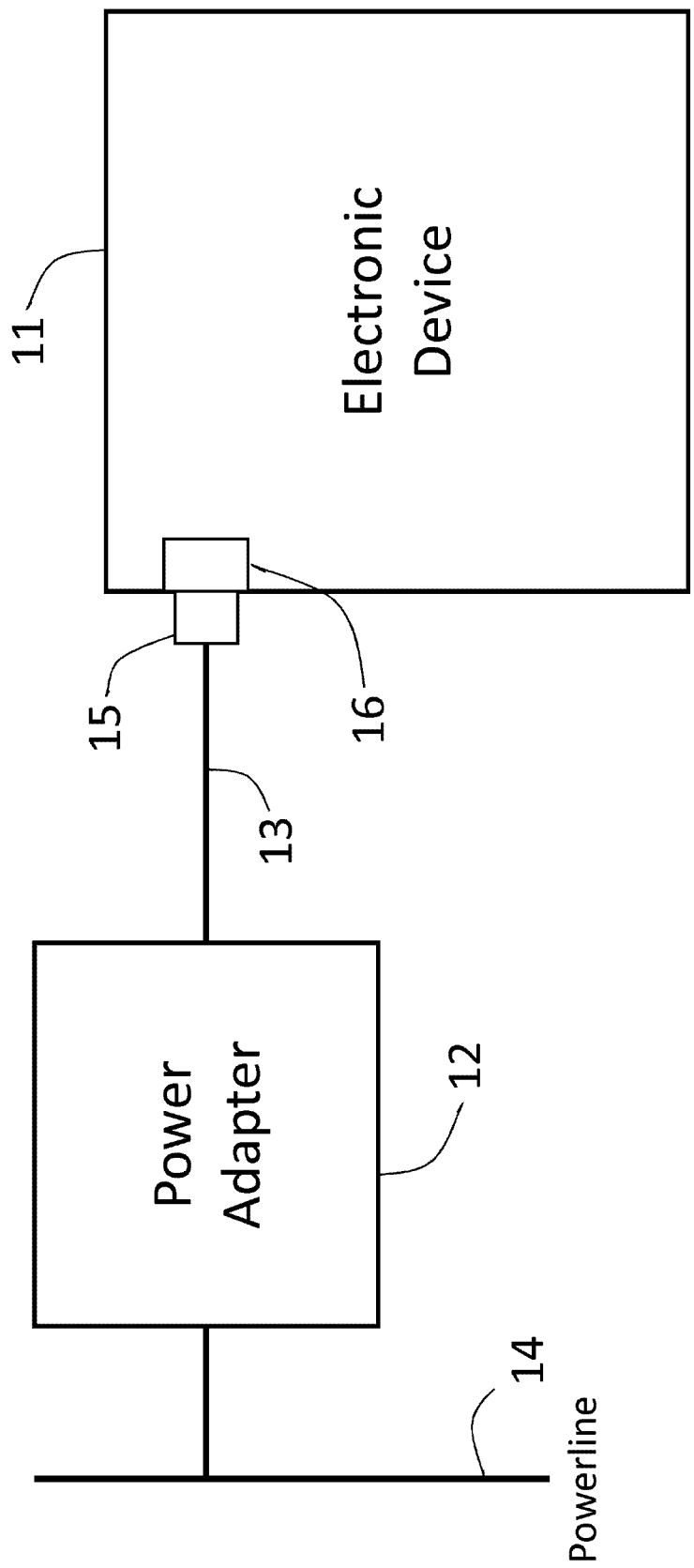
FIG. 1 is a block diagram showing a functioning electronic device (ED) 11 electrically connected to a power adapter 12 in accordance with conventional practices.
Figure 2:
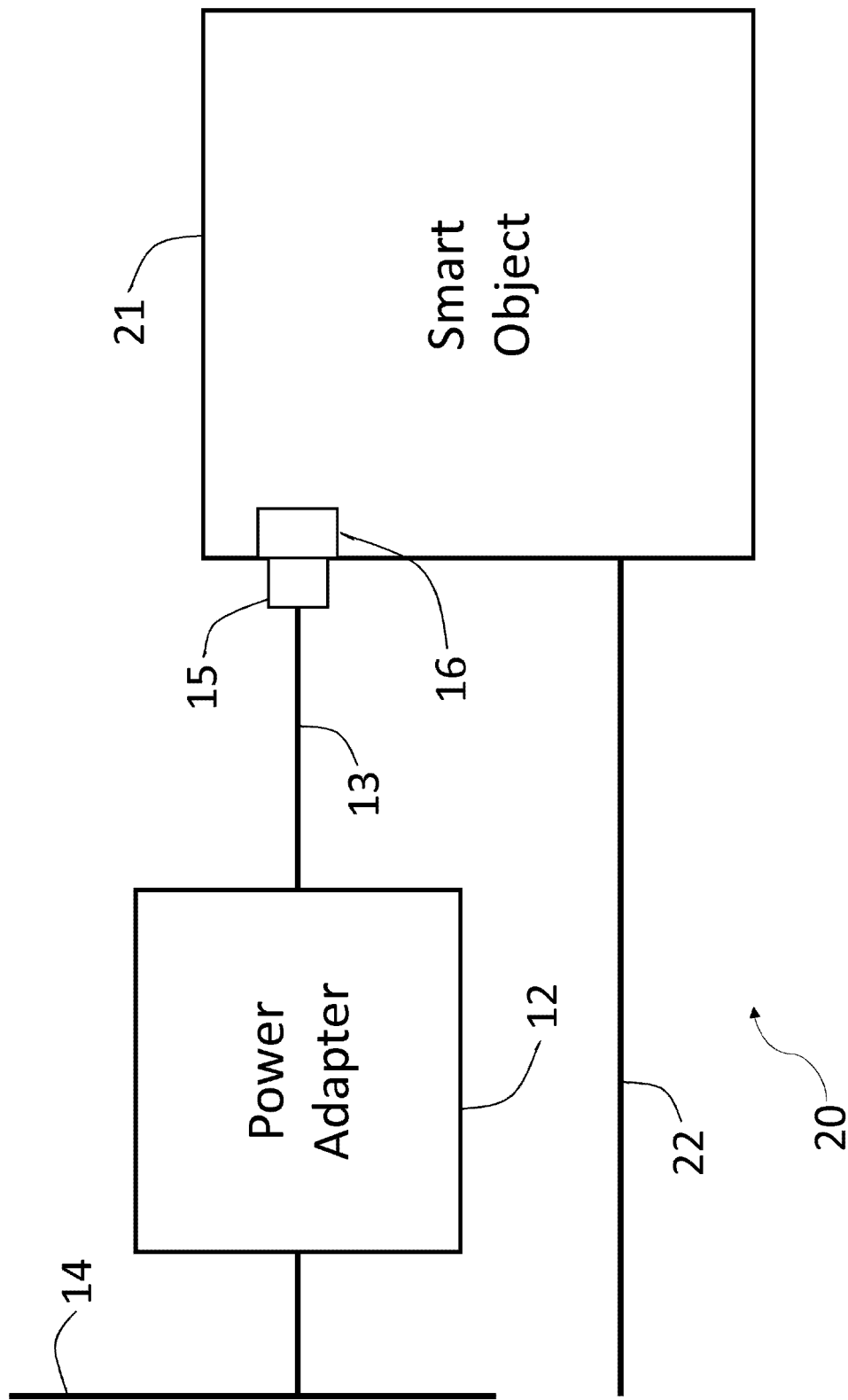
FIG. 2 is a block diagram illustrating a conventional set-up for an IoT device, wherein a smart object is electrically connected to a conventional power adapter to receive electrical power and connected to a network infrastructure with separate cables or wires.
Figure 3:
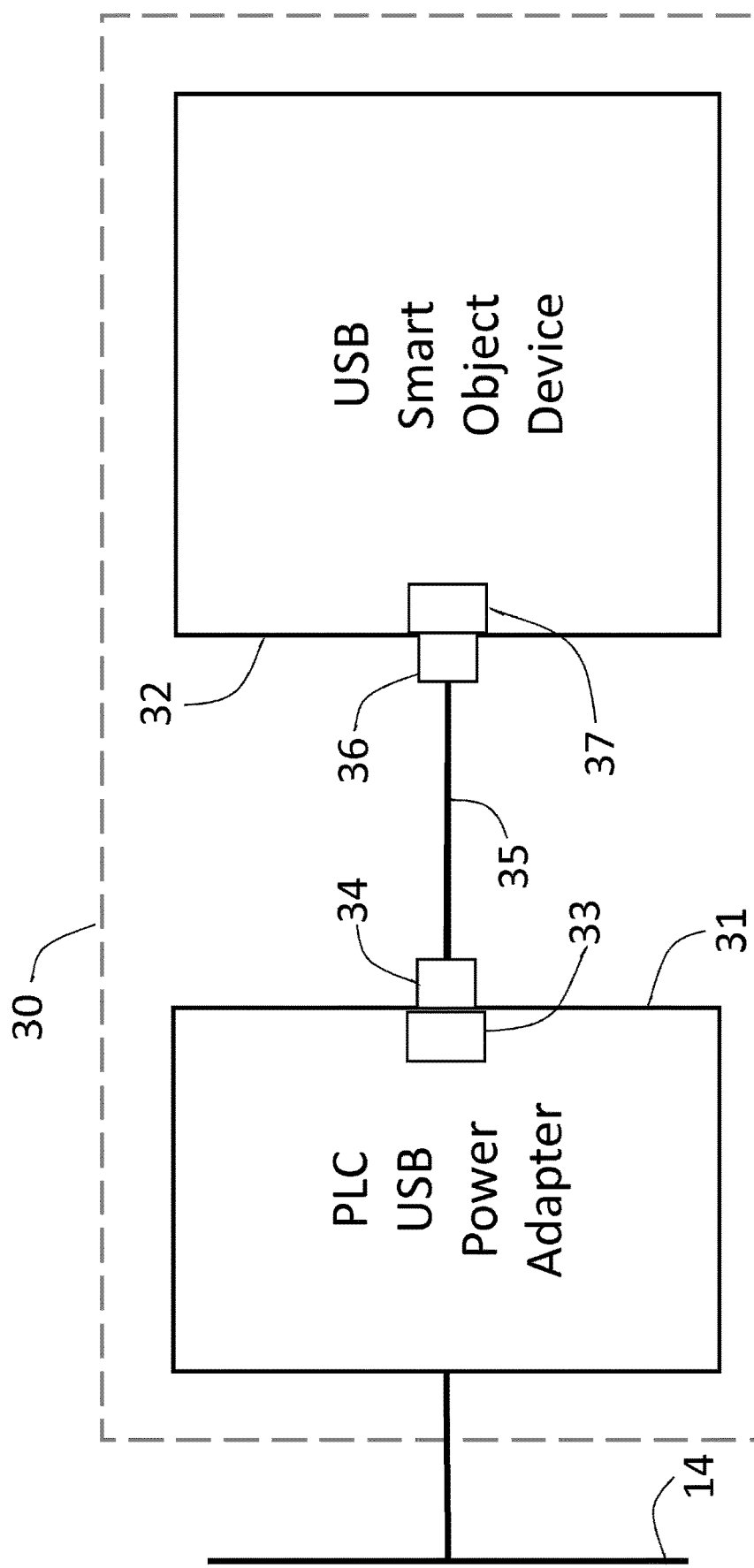
FIG. 3 is a functional block diagram illustrating an IoT connection using a USB power adapter in accordance the present invention.

Referring to FIG. 3, there is shown a functional block diagram that illustrates an IoT connection for Smart Object 32 (or USB peripheral device) using USB power adapter 31 in accordance the present invention. USB is a standard that has both the power and data communication capability under a defined detail on the physical, electrical and data aspect. In order for USB power adapter 31 to achieve data communication, USB power adapter 31 includes a built-in powerline communication interface to fulfill the requirement of back-end data communication function. The power input of USB power adapter 31 is connected to powerline 14. USB power adapter 31 includes USB receptacle 33 for the output connection. USB cable 35 includes USB plugs 34 and 36. USB plug 34 is plugged into USB receptacle 33 of USB power adapter 31. USB plug 36 is connected to USB receptacle 37 of USB Smart Object 32. USB power adapter 31 provides network connectivity between USB Smart Object 32 and the network infrastructure (i.e. Internet) by routing electronic data signals from USB Smart Object 32 to powerline 14 which is in data communication with a back-end server. The built-in power line communication interface also transfers electronic data signals from power line 14 to USB Smart Object 32. These operational characteristics of USB power adapter 31 are described in the ensuing description with respect to FIG. 5.

Figure 4:
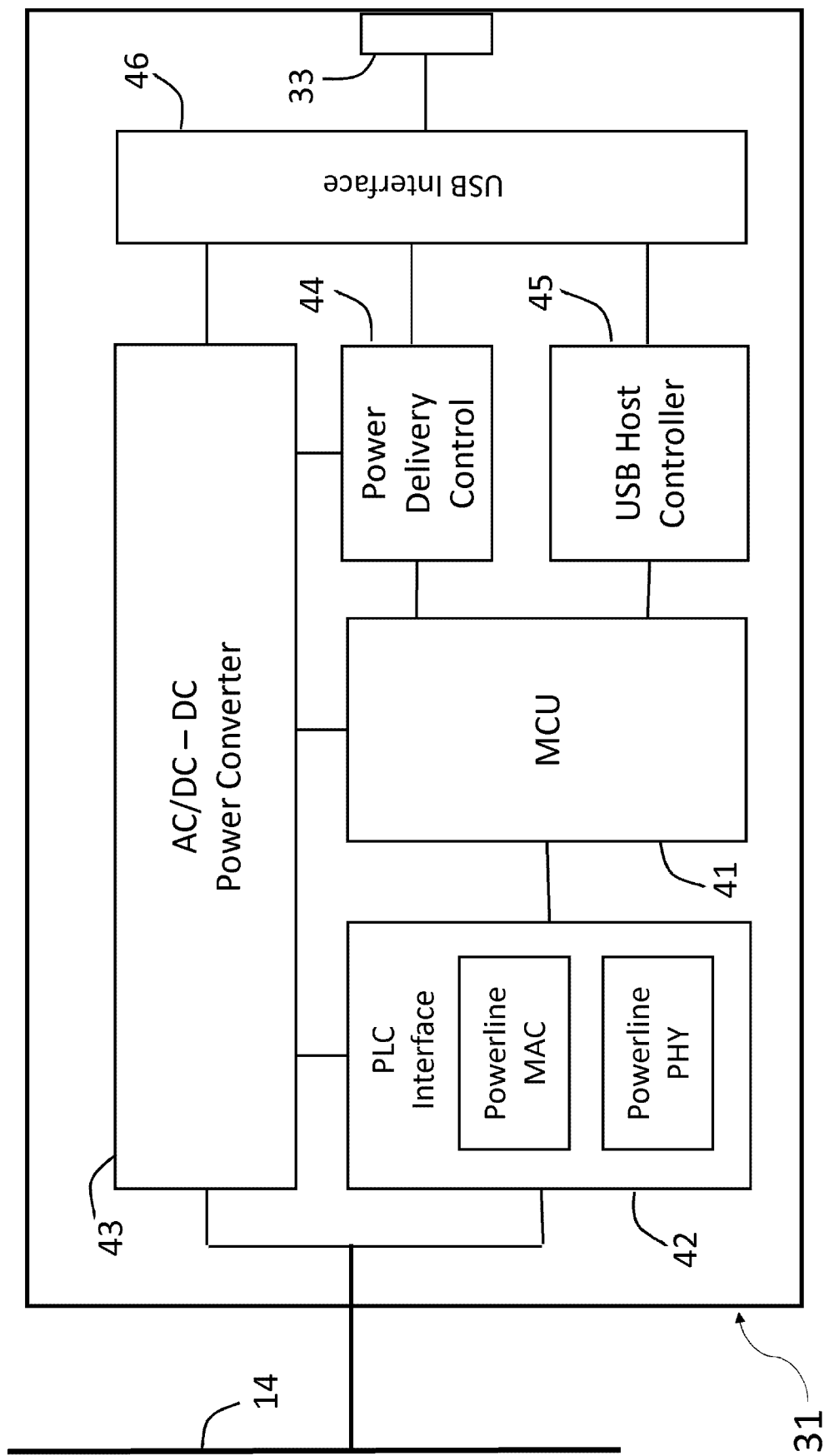
FIG. 4 is a functional block diagram of the USB power adapter of the present invention.

Referring to FIG. 4, there is shown a block diagram of a USB power adapter 31 in accordance with an exemplary embodiment of the present invention. As described in the forgoing description, USB power adapter 31 includes built-in powerline communication interface circuitry and a power input configured for electrical connection to the AC or DC powerline 14. Within USB power adapter 31, the powerline is connected to both the power converter 43 and powerline communication interface 42 in order to provide two essential functions in accordance with the invention: electrical power and data communication for the target Smart Object or USB peripheral device 32 that is connected to USB receptacle 33 of USB power adapter 31. Powerline communication interface circuit 42 is described in detail in the ensuing description. Power converter 43 and the power delivery control 44 form the core of the power drive. The power converter 43 will have the extra AC/DC converter if powerline 14 is providing AC power. In such a configuration, the converted DC voltage will undergo DC/DC conversion that provides the working DC voltage to support the operation of all electronic circuitry of USB power adapter 31. In addition to cooperating and working with power delivery control 44, the power converter 43 is configured to deliver the $V_{BUS}$ voltage and current that conforms to the USB Power Delivery (PD) standard. Thus, the $V_{BUS}$ voltage and current constitute the source power that is provided to USB receptacle 33. This source power conforms to the power requirements of the Smart Object or USB peripheral device 32 that is connected to USB receptacle 33 via cable 35.

As shown in FIG. 4, Microcontroller Unit (MCU) 41 is the core of USB power adapter 31 and is responsible all the processing work. In additional to controlling power converter 43 and power delivery control 44, MCU 41 handles the data communication between powerline 14 and the USB peripheral device 32 connected to USB receptacle 33. MCU 41 performs many functions. MCU 41 not only handles the powerline communication protocol over the powerline communication interface 42 but also manages the communication between USB host controller 45 and the USB peripheral device 32 via the USB interface 46. The powerline communication interface 42 functions as an I/O controller for the MCU 41 and includes the powerline PHY and MAC layers.

Figure 5:
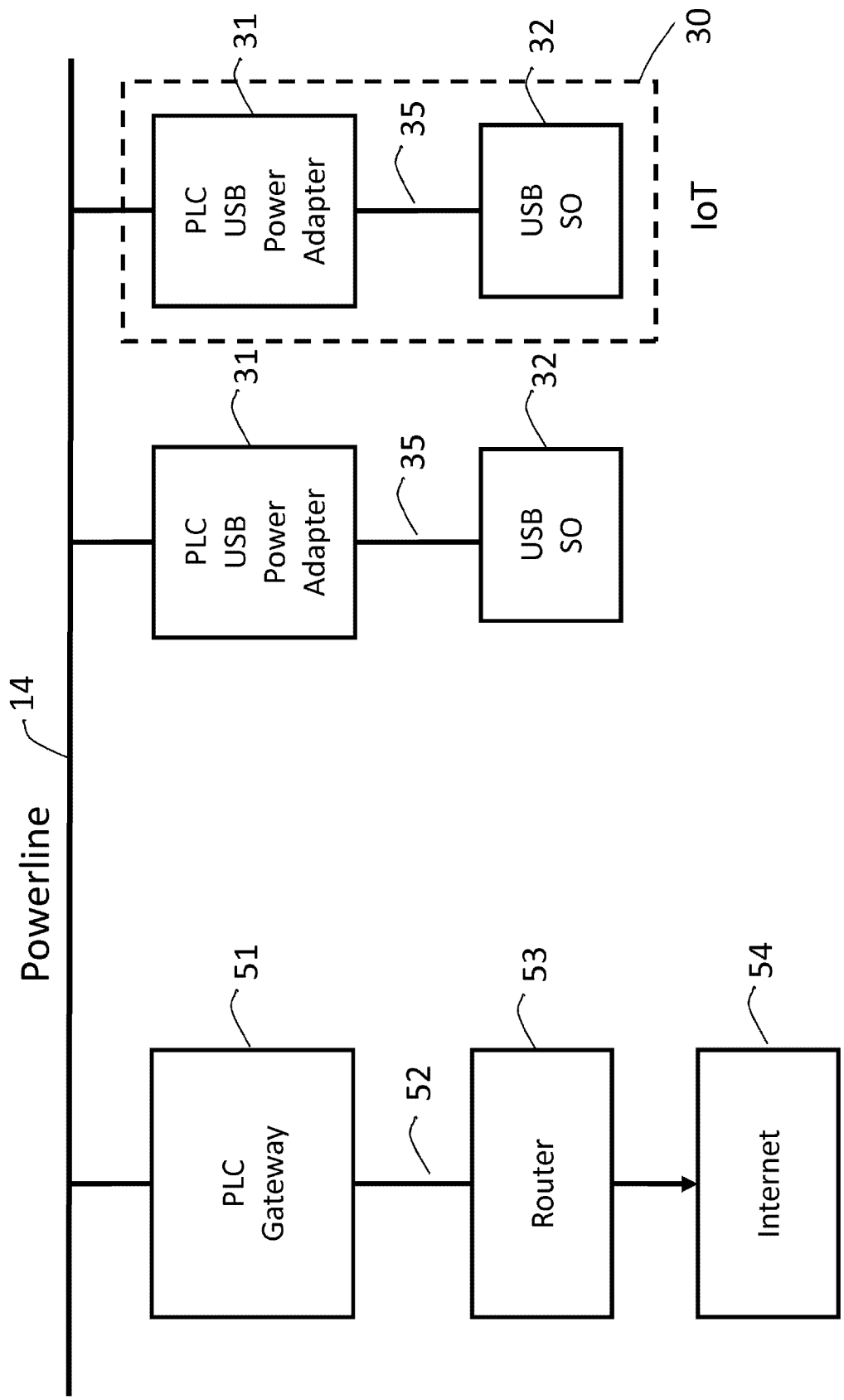
FIG. 5 is a block diagram of a powerline communication network in which a plurality of USB power adapters of the present invention are coupled to the powerline of the communication network, wherein each USB power adapter is in communication with a corresponding USB peripheral device or USB smart object.

The MCU 41 handles the upper layer of powerline communication protocol to make sure of proper communication between PLC (Powerline Communication) USB power adapters 31 and the gateway (see FIG. 5). When USB power adapter 31 is plugged into powerline 14, USB power adapter 31 must first setup the connection with the PLC gateway 51, as shown in FIG. 5, for the powerline network configuration. USB power adapter 31 then waits for the connection of the USB peripheral device 32. Once the USB peripheral device 32 is connected, the Power Delivery control 44 establishes the proper power for the USB peripheral device 32 and gets the USB peripheral device 32 ready to operate. Then, MCU 41 and USB host controller 45 will start to communicate with the USB peripheral device 32. USB host controller 45 will first start the enumeration process, which is well defined in the art, and collect device configuration information about the USB peripheral device 32. MCU 41 and USB host controller 45 then use this device configuration information to setup the corresponding communication pipes with the specific endpoints in the same manner as a normal USB device setup in a PC environment. The collected device information is also transferred to the PLC gateway 51 for setting up the corresponding communication channel. USB power adapter 31 is now ready to communicate and handle the USB peripheral devices 32 with the proper device information. Data can now be transferred between USB peripheral devices 32 and the gateway via the USB power adapter 31 over the powerline 14 with a defined protocol. In an exemplary embodiment, powerline communication interface 42 may be realized using suitable commercially available technology such as HomePlug® technology. However, it is to be understood that other suitable technology may be used to implement powerline communication interface 42.

FIG. 5 is a block diagram of a data communication network based on the powerline 14. Each USB Smart Object (SO) 32 (or USB peripheral device) is in USB communication with a corresponding USB power adapter 31 by a USB cable 35. Each USB power adapter 31 is electrically connected to powerline 14. The configuration is the same as that shown in FIG. 3 and forms a functional IoT entity 30. Powerline Communication (PLC) gateway 51 is electrically connected to powerline 14 so as to perform the interface between the powerline communication network and the Internet 54 through the Local Area Network (LAN) 52 and the router 53. As shown in FIG. 5, there can be more than one IoT entity 30 in communication with the powerline network. Data from USB Smart Object (SO) 32 is sent through the USB cable 35 and is input into USB power adapter 31. As described in the foregoing description, USB power adapter 31 converts the data into data packets (i.e. packetized data) so as to communicate over powerline 14 with the agreed upon protocol. This enables data to be transferred between the IoT devices 30 or between IoT devices 30 and PLC Gateway 51. As a result of Powerline Communication (PLC) gateway 51 performing the interface between the powerline communication network and the Internet 54 through the Local Area Network (LAN) 52 and the router 53, a complete data path is established between the USB Smart Object (SO) 32 and the Internet so as to form the IoT operation environment.

FIGS. 6-9 show several exemplary embodiments of the USB power adapter of the present invention. However, it is to be understood that in each of these embodiments, the USB power adapter comprises the circuitry and components that are shown in the block diagram of FIG. 4.

Figure 6:
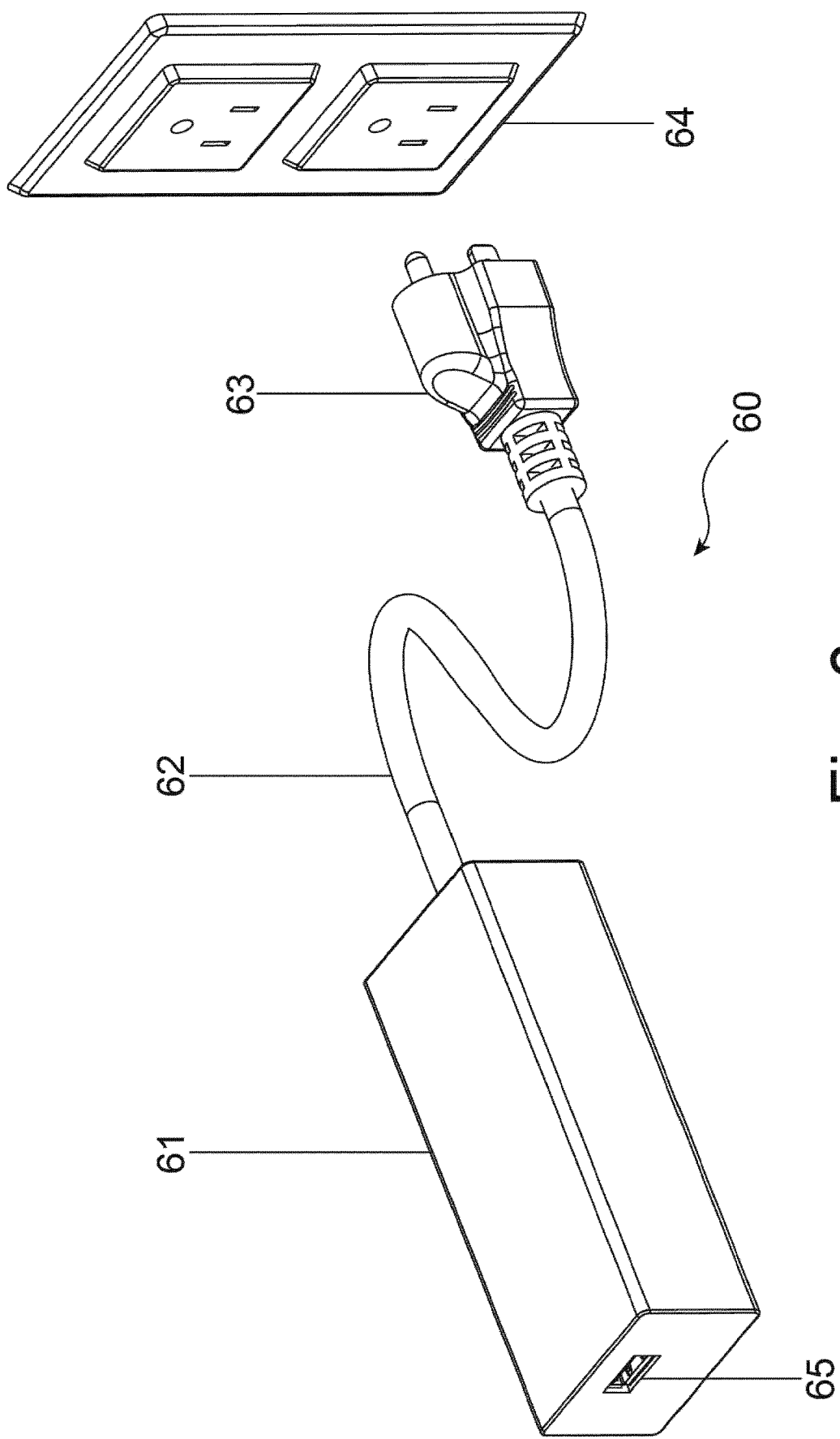
FIG. 6 is a diagram of a USB power adapter in accordance with an exemplary embodiment of the present invention, the USB power adapter being configured to be connected to an AC power source.

Referring to FIG. 6, there is shown USB power adapter 60 in accordance with an exemplary embodiment of the present invention. USB power adapter 60 further includes casing or housing 61 and a single electrical cable 62 configured with male electrical plug 63. Male electrical plug 63 is configured to be plugged into AC wall receptacle 64 that is found in many homes and offices. Casing 61 includes USB receptacle 65 for receiving a USB plug that is connected to a USB peripheral device. In another embodiment, casing 61 may be configured with a plurality of USB receptacles so to receive USB plugs from a plurality of USB peripheral devices. Thus, a single USB power adapter 60 may serve a plurality of USB peripheral devices. In another embodiment, cable 62 is replaced with a socket power cord that can be configured with different male electrical plugs that correspond to the power receptacle standards of different countries.

Figure 7:
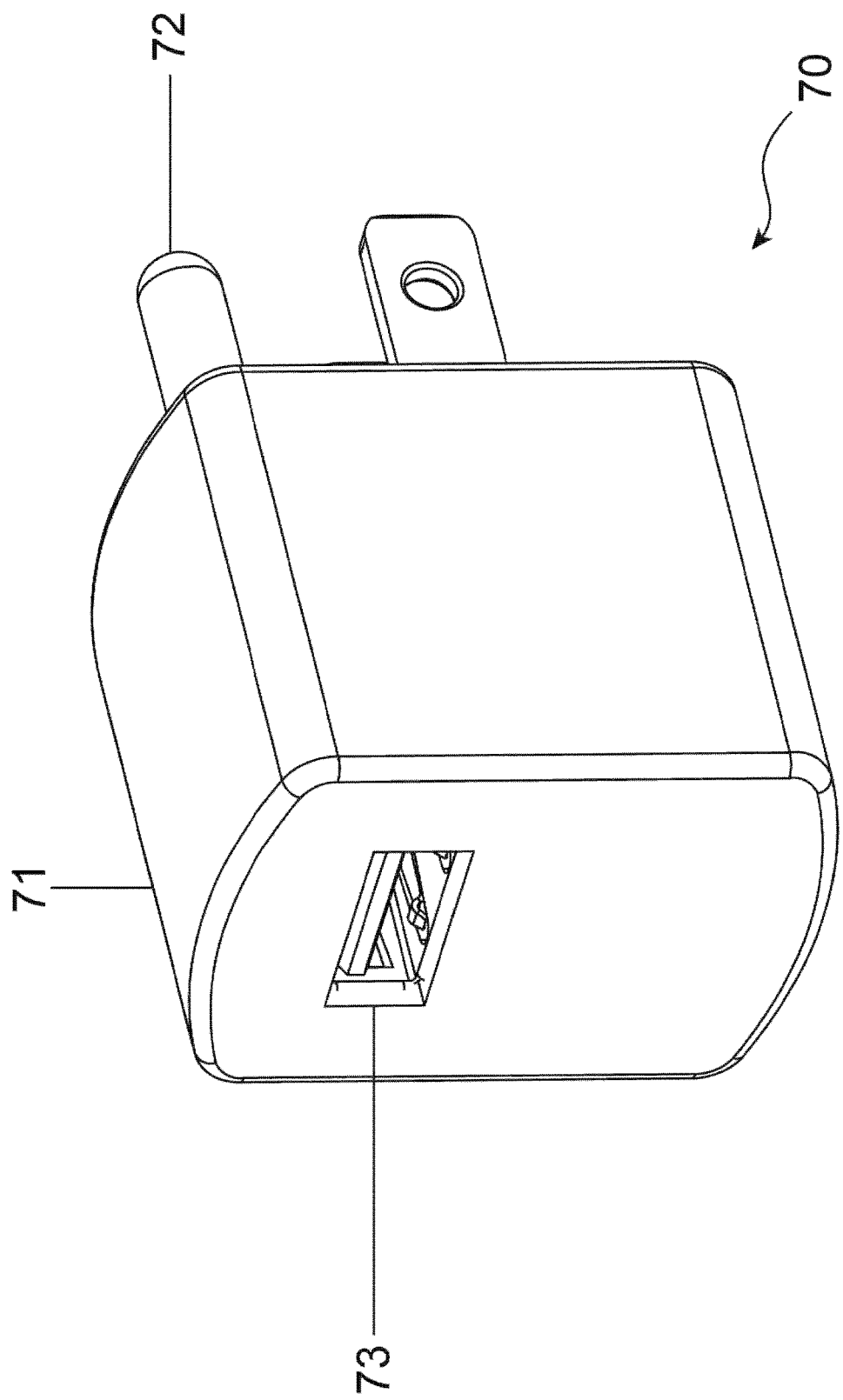
FIG. 7 is a diagram illustrating a USB power adapter having a built-in electric plug in accordance with another exemplary embodiment of the present invention.

Referring to FIG. 7, there is shown USB power adapter 70 in accordance with another embodiment of the present invention. In this embodiment, USB power adapter 70 is configured to have a relatively lower power rating thereby allowing it to be fabricated with a small-sized casing 71 without requiring an external electrical cable. Casing 71 includes male electrical plug 72 and USB receptacle 73. USB receptacle 73 receives a USB plug that is in data signal communication with a USB peripheral device. The USB plug may be directly connected to the USB peripheral device or it may be part of a cable that is in data signal communication with the USB peripheral device.

Figure 8:
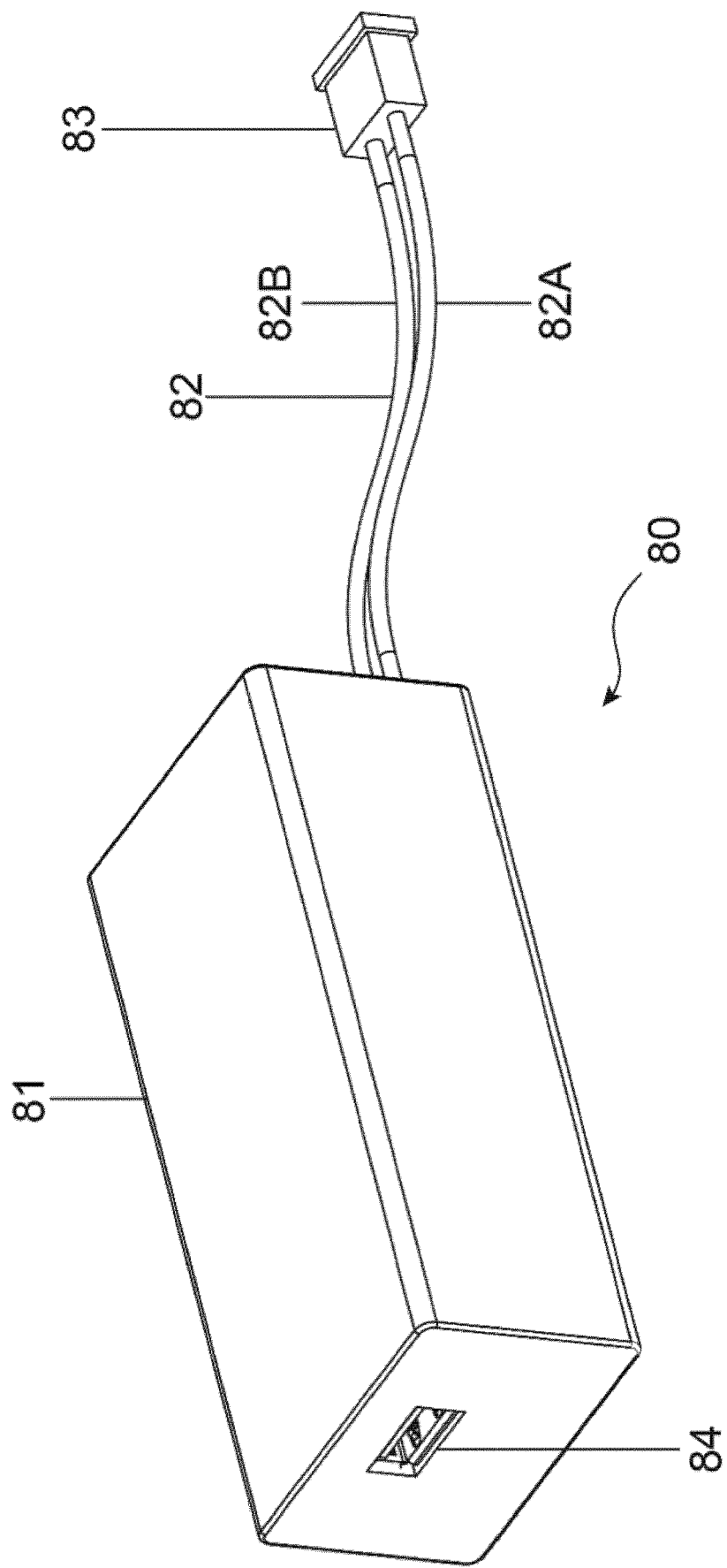
FIG. 8 is a diagram illustrating a USB power adapter in accordance with another exemplary embodiment of the present invention, the USB power adapter having a cable configured to be connected to a DC power source.

Referring to FIG. 8, there is shown USB power adapter 80 in accordance with another embodiment of the present invention. USB power adapter 80 is configured to be connected to a DC voltage powerline instead of an AC voltage powerline. USB power adapter 80 includes a casing 81 that includes USB receptacle 84 which has the same function and configuration as USB receptacles 65 and 73 shown FIG. 6 and FIG. 7, respectively. In this embodiment, USB power adapter 80 includes an electrical cable 82 that has dual electrical wires 82A and 82B that are attached to electrical connector 83. Electrical connector 83 is configured to be plugged into a DC power source. Wires 82A and 82B provide the supply voltage V+ and electrical ground, respectively, for the electronic circuitry in casing 81 and also provide the powerline connectivity to USB power adapter 80. Different electrical connectors may be used in place of electrical connector 83 in order to mate with different DC power source connectors.

Figure 9:
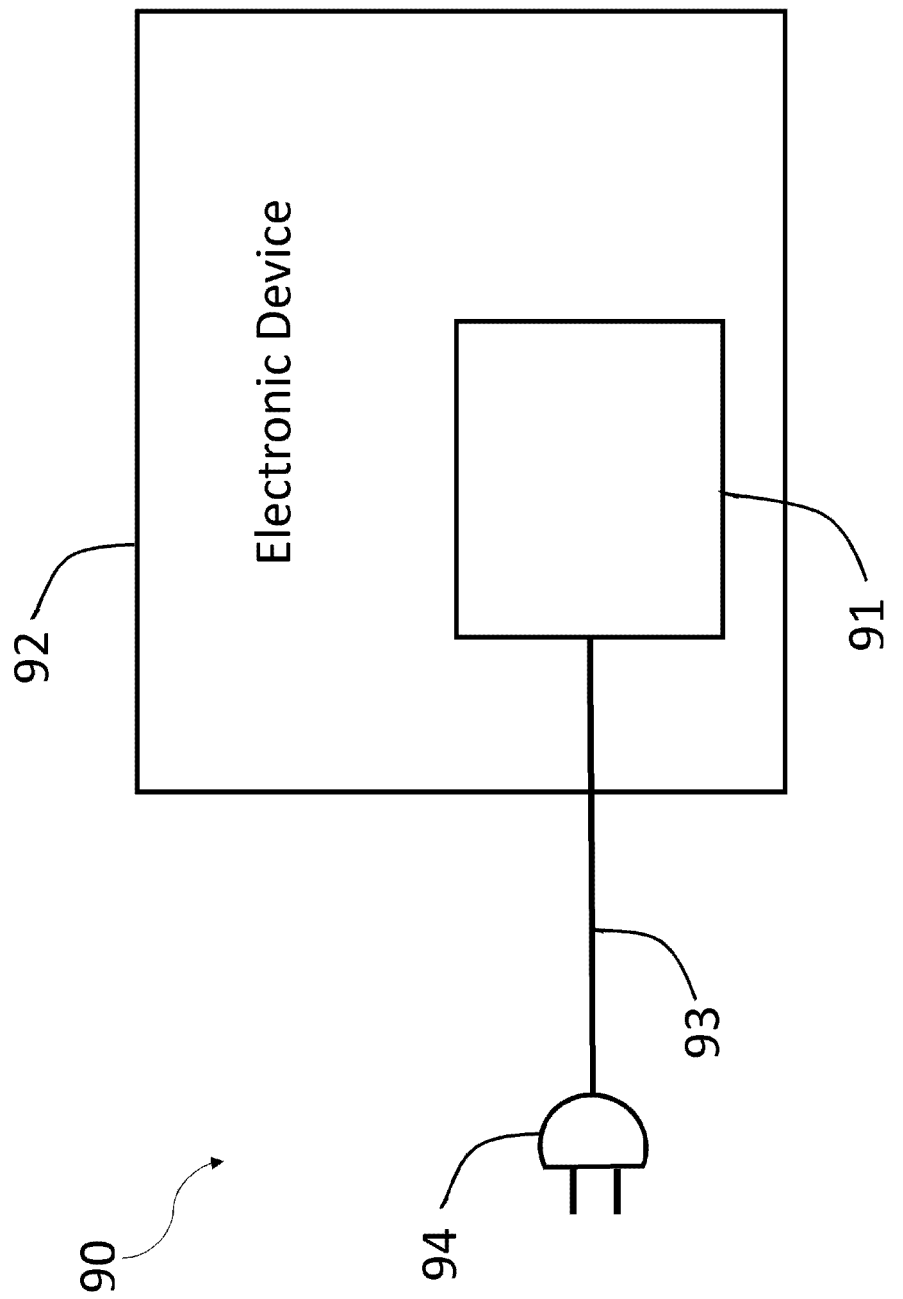
FIG. 9 is a diagram illustrating an electronic device configured to have built-in thereto a USB power adapter of the present invention, the USB power adapter being configured to be connected to an AC power source.

Referring to FIG. 9, there is shown a block diagram of another embodiment of the present invention. The USB power adapter of the present invention, indicated by reference number 91, is incorporated into electronic device 92. Thus, all of the USB power adapter circuitry shown in FIG. 4 is located within the casing of electronic device 92. Electronic device 92 can be an end-user device such as a desk lamp, an oven or an air conditioner, etc. However, it is to be understood that electronic device 92 can be almost any electronic device that requires exchange of data signals with a data communication network such as the Internet. In an exemplary embodiment, the USB power adapter 91 is realized as an internal printed circuit board assembly (PCBA) that is integrated with the electronic circuitry of electronic device 92. Electronic device assembly 90 includes electrical cable 93. Electrical cable 93 has male electrical plug 94 that is configured to be plugged into AC powerline wall socket, which has the same configuration as AC powerline wall socket 64 in FIG. 6. A significant advantage of the embodiment shown in FIG. 9 is that electronic device assembly 90 requires only a single electrical cable 93 to effect data signal communication with a network and also deliver electrical power to the circuitry of electronic device 92 and the circuitry of USB power adapter 91.

The preceding description of the disclosed embodiments is provided to enable any person skilled in the art to make or use the present invention. The embodiments are chosen and described in order to best explain the principles of the invention and its practical applications. Various modifications to these embodiments will readily be apparent to those skilled in the art, and the generic principles defined herein may be applied to other embodiments without departing from the spirit or the scope of the invention. Thus, the present invention is not intended to be limited to the embodiments shown herein but is to be accorded the widest scope consistent with the following claims and the principles and novel features disclosed herein. Any reference to claim elements in the singular, for example, using the articles "a", "an" or "the" is not to be construed as limiting the element to the singular.

What is claimed is:

1. A USB power adapter for establishing communication between a USB peripheral device and a powerline communication network, comprising:
    an electrical power input configured to be electrically coupled to a powerline having a voltage and current;
    a USB port configured for electronic signal communication with a USB peripheral device;
    a USB interface electrically coupled to the USB port;
    a power converter circuit electrically coupled to the electrical power input and the USB interface, the power converter circuit configured to convert the voltage and current into a DC voltage and current that functions as a supply voltage and current, the power converter circuit being further configured to provide the DC voltage and current into USB $V_{BUS}$;
    a power delivery control circuit electrically coupled to the power converter circuit and the USB interface, the power delivery control circuit being configured to implement power delivery communication protocol with the USB peripheral device and generate the proper voltage and current levels for the USB $V_{BUS}$;
    a USB host controller electrically coupled to the USB interface and configured to function as USB host for the USB peripheral device, the USB host controller being configured to implement data communication with the USB peripheral device based on standard USB protocol;
    a powerline communication interface electrically coupled to the electrical power input and configured to implement a specific powerline network communication protocol with a gateway that is electrically coupled to the powerline; and
    a microcontroller unit electrically coupled to the USB host controller and the powerline communication interface, the microcontroller being configured to (1) setup network communication with the gateway via the powerline communication interface, (2) cause the USB host controller to initiate an enumeration process when a USB peripheral device is in electronic signal communication with the USB port, (3) establish a corresponding IoT operation based on information retrieved from the USB peripheral device, (4) receive an IoT command from the gateway via the powerline communication interface, and (5) direct the IoT command to established IoT operation so as to enable communication with and operation of the USB peripheral device via the USB host controller.

2. The USB power adapter according to claim 1 wherein the powerline is a DC voltage powerline.

3. The USB power adapter according to claim 1 wherein the powerline is an AC voltage powerline.

4. The USB power adapter according to claim 1 further comprising means for electrically connecting the electrical power input to a powerline.

5. The USB power adapter according to claim 1 further comprising an electrical cable electrically connected to the electrical power input and the powerline.

6. The USB power adapter according to claim 1 further comprising a casing.

7. The USB power adapter according to claim 1 wherein the USB port is chosen from the group comprising type-A, type C and any USB receptacle that is configured in accordance with USB standards.

8. The USB power adapter according to claim 1 wherein the powerline communication interface is chosen from the group comprising a HomePlug® Powerline interface and other industry standard on powerline communication.

9. The USB power adapter according to claim 6 wherein the electrical power input comprises a male electrical plug attached to the casing.

10. A system for enabling a USB smart object device to function as an IoT device, comprising:
    a powerline having a voltage and current;
    a powerline communication gateway electrically coupled to the powerline;
    a router device in electronic signal communication with the powerline communication gateway and configured for electronic signal communication with the internet; and
    a USB power adapter comprising:
        an electrical power input configured to be electrically coupled to the powerline,
        a USB port configured for electronic signal communication with a USB smart object device,
        a USB interface electrically coupled to the USB port,
        a power converter circuit electrically coupled to the electrical power input and the USB interface, the power converter circuit configured to convert the voltage and current into a DC voltage and current that functions as a supply voltage and current, the power converter circuit being further configured to convert the DC voltage and current into USB $V_{BUS}$,
        a power delivery control circuit electrically coupled to the power converter circuit and the USB interface, the power delivery control circuit being configured to implement protocol communication with the USB smart object device and generate proper voltage and current levels for the USB $V_{BUS}$,
        a USB host controller electrically coupled to the USB interface and configured to function as USB host for the USB smart object device, the USB host controller being configured to implement enumeration of the USB smart object device and communication with the USB smart object device based on USB protocol,
        a powerline communication interface electrically coupled to the electrical power input and configured to implement a specific powerline network communication protocol with the powerline communication gateway, and
        a microcontroller unit electrically coupled to the USB host controller and the powerline communication interface, the microcontroller being configured to (1) setup network communication with the gateway via the powerline communication interface, (2) cause the USB host controller to initiate an enumeration process when a USB smart object device is in electronic signal communication with the USB port, (3) establish a corresponding IoT operation based on information retrieved from the USB smart object device, (4) receive an IoT command from the gateway via the powerline communication interface, and (5) direct the IoT command to established IoT operation so as to enable communication with and operation of the USB smart object device via the USB host controller.

* * * * *